US007177940B1

(12) United States Patent
Holan et al.

(10) Patent No.: US 7,177,940 B1
(45) Date of Patent: Feb. 13, 2007

(54) REPRESENTING A SERVICE DISCOVERY STREAM AS AN N-ARY TREE

(75) Inventors: Doron J. Holan, Seattle, WA (US); Kenneth D. Ray, Redmond, WA (US); Louis J. Giliberto, Redmond, WA (US); Husni Roukbi, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1160 days.

(21) Appl. No.: 09/669,424

(22) Filed: Sep. 25, 2000

Related U.S. Application Data

(63) Continuation-in-part of application No. 09/557,947, filed on Apr. 24, 2000, now abandoned.

(51) Int. Cl.
G06F 15/167 (2006.01)
G06F 15/16 (2006.01)
(52) U.S. Cl. ...................... 709/231; 709/213
(58) Field of Classification Search .................. 707/7, 707/100, 101; 710/65; 370/408; 382/240; 709/231
See application file for complete search history.

(56) References Cited

U.S. PATENT DOCUMENTS

| | | | | | |
|---|---|---|---|---|---|
| 5,121,493 | A | * | 6/1992 | Ferguson | 707/7 |
| 5,339,421 | A | * | 8/1994 | Housel, III | 710/65 |
| 5,758,360 | A | * | 5/1998 | Zbikowski et al. | 707/101 |
| 6,011,871 | A | * | 1/2000 | Xu | 382/240 |
| 6,029,170 | A | * | 2/2000 | Garger et al. | 707/100 |
| 6,031,977 | A | * | 2/2000 | Pettus | 709/230 |
| 6,101,556 | A | | 8/2000 | Piskiel et al. | |
| 6,243,389 | B1 | * | 6/2001 | Khanna et al. | 370/408 |
| 6,282,576 | B1 | | 8/2001 | Lane | |
| 6,430,599 | B1 | | 8/2002 | Baker et al. | |
| 6,493,762 | B1 | * | 12/2002 | Chen et al. | 709/231 |
| 6,532,368 | B1 | | 3/2003 | Hild et al. | |
| 6,532,476 | B1 | * | 3/2003 | King | 707/101 |

OTHER PUBLICATIONS

Tomasz Imielinski et al., Energy Efficient Indexing on Air, Proceedings of the 1994 ACM SIGMOD International Conference on Management, 1994, pp. 25-36.*
Ming-Syan Chen et al., Indexed Sequential Data Broadcasting, The 17th International Conference on Distributed Computing Systems, May 1997.*
Anonymous, "*Definition: Tree Structure*," Webopedia, retrieved from http://www.webopedia.com May 29, 2003.
*Specification of the Bluetooth System*, v1.0B, Dec. 1, 1999.

(Continued)

*Primary Examiner*—Patrice Winder
(74) *Attorney, Agent, or Firm*—Wolf, Greenfield & Sacks, P.C.

(57) ABSTRACT

A service discovery stream is represented as an N-ary tree that provides the capability to change, add, or remove an element with only one modification to the entire tree. The number of elements in a stream are counted and each element and the element's children are converted into a node of the N-ary tree. Each node in the tree can have any number of siblings, which are linked to each other using a doubly linked list.

23 Claims, 5 Drawing Sheets

OTHER PUBLICATIONS

Riku Mettala et al., *Bluetooth Protocol Architecture* (White Paper), v1.0, Nokia Mobile Phones, Sep. 29, 1999.

Brent Miller, et al., *Mapping Salutation Architecture APIs to Bluetooth Service Discovery Layer* (White Paper), v1.0, IBM Corporation, Jul. 1, 1999.

IEEE Standard, 802.11, *Part 11: Wireless LAN Medium Access Control (MAC) and Physical Layer (PHY) Specifications*, 1st Ed. 1999, and Supplements 802.11a-1999 and 802.11b-1999.

Bob O'Hara and Al Petrick, *IEEE 802.11 Handbook A Designer's Companion*, Dec. 1999.

\* cited by examiner

REPRESENTING A SERVICE DISCOVERY STREAM AS AN N-ARY TREE

RELATED APPLICATIONS

This application is a continuation in part of U.S. patent application Ser. No. 09/557,947 filed Apr. 24, 2000, now abandoned.

TECHNICAL FIELD

This invention relates generally to communication between electronic devices and, more particularly, relates to methods to discover services provided by server applications.

BACKGROUND OF THE INVENTION

There are a significant number of wireless technologies in the marketplace today. The emerging standard for short range wireless technology is called Bluetooth. Bluetooth is a Radio Frequency (RF) specification for short-range, point-to-multipoint voice and data transfer. Bluetooth can transmit through solid, non-metal objects and its nominal link range is from 10 cm to 10 m, but can be extended to 100 m by increasing the transmit power. It is based on a low-cost, short-range radio link, and facilitates ad hoc connections for stationary and mobile communication environments. The Bluetooth wireless technology allows users to make connections between communication devices such as mobile phones and desktop and notebook computers. Finding and making use of services in these environments is becoming increasingly important due to the continued growth in wireless technologies as seen by the proliferation of mobile computing devices and also to the merging of wireless technologies and computer technologies. These services can include basic services such as printing, faxing, paging, etc., more complex services such as video conferencing and teleconferencing, and any other type of service that a service provider may provide. Bluetooth utilizes a Service Discovery Protocol to allow communication devices to find and make use of these services.

A service discovery stream consists of a linear stream of data that has data structures encoded within it to represent an available service on an enabled device. There are eight types of data encoded within a service discovery stream. These types are nil (null type), unsigned integer, signed twos-complement integer, universally unique identifier (UUID), text string, Boolean, data element sequence, data element alternative, and uniform resource locater (URL). A data element sequence is a data element whose data field is a sequence of data elements. A data element alternative is a data element whose data field is a sequence of data elements from which one data element is to be selected.

Each element in the service discovery stream has a size attribute which describes the byte size of its content. A sequence or alternative element may have children elements within it. Since the terminating elements are embedded in the outer elements, the service discovery stream must be constructed from the bottom up.

There are several issues that arise with service discovery streams. Creating a well formed service discovery stream is not straightforward. Traversing a service discovery stream in a simple manner is not easy because a large amount of descriptive data must be maintained due to the embedded data structures contained in the service discovery stream. These embedded data structures may also have structures embedded in them ad infinitum. Additionally, modifying a service discovery stream can be complex and introduce errors. The modification, whether it be adding, changing, or removing a data structure, may alter bytes before, after, and at the point of modification, thereby increasing the likelihood of error. What is needed is a way to represent a service discovery stream that reduces the complexity of traversing the stream and that makes modifications to the stream easier to implement.

SUMMARY OF THE INVENTION

In view of the above problems, the service discovery stream is represented as an N-ary tree. By representing the service discovery stream as an N-ary tree, each element does not need to know the size of all of its children elements until the N-ary tree is converted into a service discovery stream. This allows for the quick construction of a well formed service discovery stream. The process is centered on grouping the data together and not how the data is actually represented in the service discovery stream. Traversing an N-ary tree is also a much simpler task. Very little information needs to be maintained during the traversal. Modifying a node in an N-ary tree is a trivial task. Since the tree is a non linear structure, any of the three types of modifications (changing, adding, or removing) requires only one modification to the entire tree.

The content of the service discovery stream is traversed linearly to ensure it is well formed and the number of data elements contained in the service discovery stream is counted. The number of nodes in the N-ary tree is determined based upon the number of data elements. A list head is initialized. An element from the service discovery stream is obtained and a node is initialized with the element and information about the element. If the node is a leaf node, the node is added to the list head and the next element from the service discovery stream is obtained. If the node is a parent node, the node is added to the list and the element is checked to see if there are any children. If there are children, the children are listed in the list head of the parent node. The next element is obtained from the service discovery stream and a node is initialized with the next element. The process is repeated until all elements in the service discovery stream have been converted.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
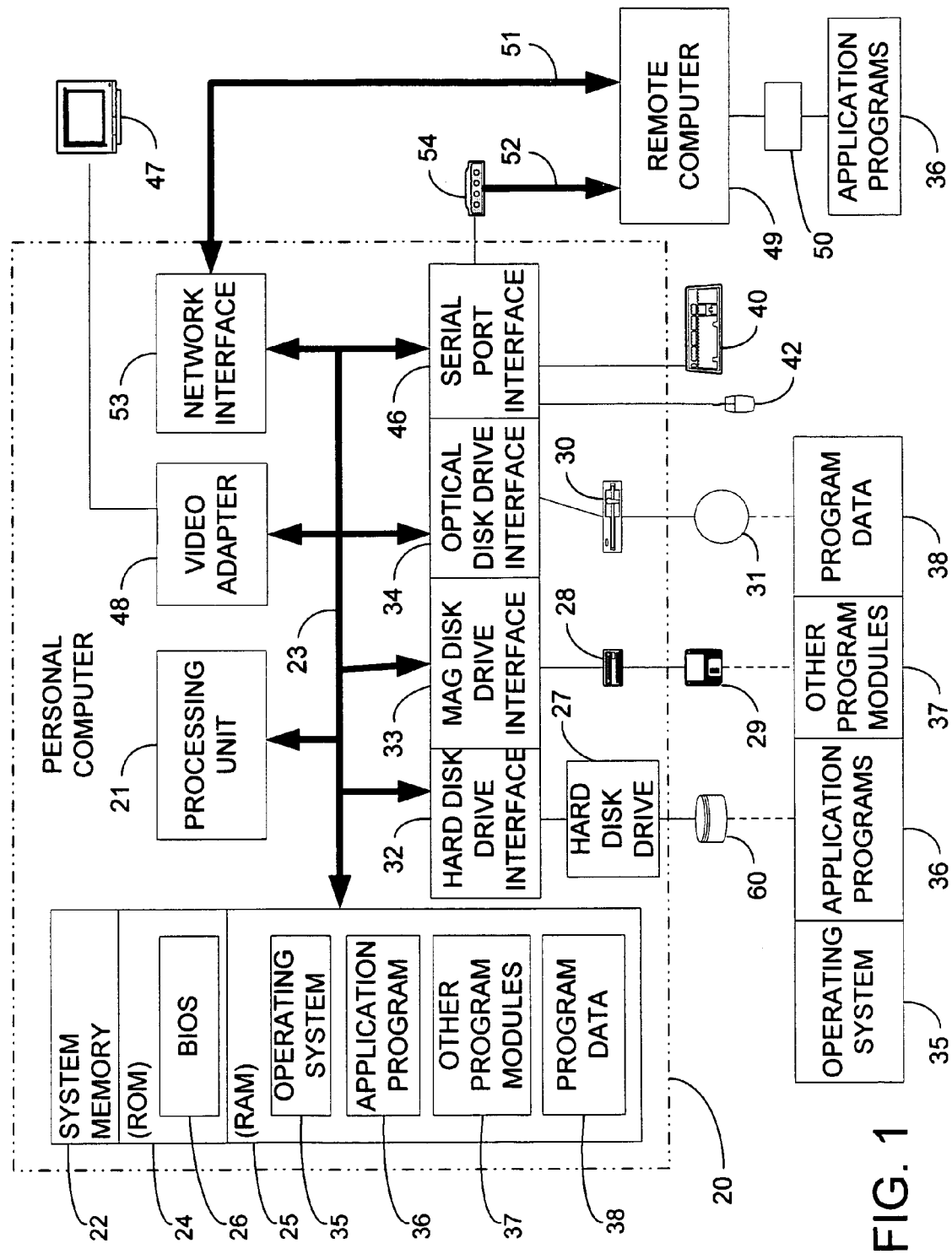
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

When converting a service discovery stream into an N-ary tree, each data type is classified as either a leaf node or a parent node. A leaf node is defined as a node which can contain no children and a parent node is defined as a node that can potentially have children. The types of data that are leaf node types are Nil, Unsigned integer, Signed integer, UUID (universally unique identifier), Text string, Boolean, and URL (uniform resource locator). The types of data that are parent node types are Data element sequence and Data element alternative. By definition, each node in the tree, including the root node, can have N siblings, where N is any number. The siblings are connected to each other using a doubly linked list. A doubly linked list is a series of nodes in which each node refers to both the next node and the preceding node, thereby forming two-way references. A doubly linked list can be traversed both forward and backward. Conversely, a singly linked list can only be traversed forward.

Once a service discovery stream has been acquired, two steps are performed before it is converted into an N-ary tree. In the first step, the content of the service discovery stream is validated by traversing the stream linearly to make sure it is well formed. If the service discovery stream is not well formed, an error is returned and the service discovery stream is not converted into an N-ary tree. In the second step, the number of elements contained in the service discovery stream is counted.

Figure 2:
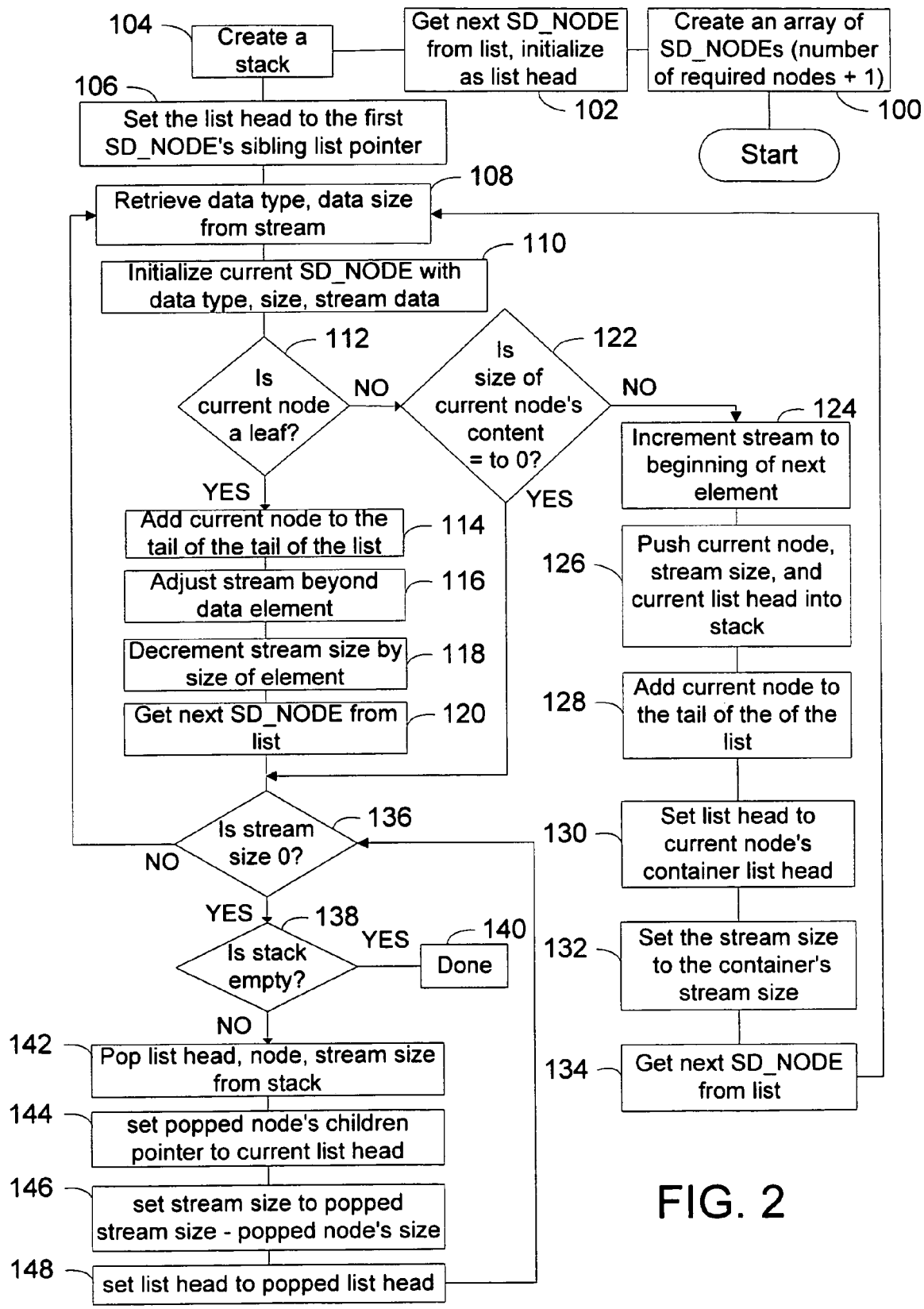
FIG. 2 is a flowchart illustrating how a service discovery stream is converted into an N-ary tree using a sentinel head.

Turning now to FIG. 2, the steps taken to convert a service discovery stream will be described when the service discovery stream has a sentinel node. A sentinel node is a node that contains no data and its purpose is to demarcate the terminal node. In the description that follows, the term "container" refers to either an alternative element or a sequence element. An array of SD_NODEs is created (step 100). The number of nodes in the array is set to the number of required nodes plus one. The number of required nodes is based upon the number of elements in the stream. A node is defined as:

```
Struct SD_NODE_HEADER{
    UCHAR Type;          // contains the element type
    UCHAR SpecificType;  // contains specific element type (i.e, a 4
                         byte integer)
    LIST_HEAD Link;
}
struct SD_NODE {
    SD_NODE_HEADER hdr;
    union {
        // all of the different data types defined
        // . . . etc. . .
        // sequence
        SD_NODE_HEADER sequenceHdr;
        // alternative
        SD_NODE_HEADER alternativeHdr;
    } u;
}
``` where sequenceHdr and alternativehdr are list heads. A list head in its simplest form is the beginning of the list. An SD_NODE from the stream is acquired and initialized as the list head (step 102). A stack is created (step 104) and the list head is set to the first SD_NODE's sibling list pointer (step 106). The data type and data size is retrieved from the stream (step 108) and the current node is initialized with the data type, the data size, and the stream data (step 110). The current node is checked to see if it is a leaf node or a parent node (step 112).

If the current node is a parent node, the size of the node's content is determined and checked to see if it is equal to zero (step 122). If the content is non-zero, the service discovery stream is incremented to the beginning of the next element of the service discovery stream (step 124). The current list head, current node, and service discovery stream size is pushed into the stack (step 126) and the current node is added to the tail of the list head (step 128). The list head is set to the current node's container list head (step 130) and the service discovery stream size is set to the size of the container's stream size (step 132). The next node is obtained from the list (step 134) and steps 108–112 are repeated for the service discovery stream. If the content is zero, the stream size is checked to determine if it is zero (step 136).

If the current node is a leaf node, the current node is added to the tail of the tail of the list head (step 114) and the service discovery stream is adjusted beyond the data element (step 116). The stream size is decremented by the size of the element (step 118) and the next node is obtained from the list (step 120). The stream size is then checked to determine if it is zero (step 136).

If the stream size is not zero, the process for the next node is started by repeating steps 108 to 136. If the stream size is zero, the stack is checked to see if it is empty (step 138). If the stack is empty, the conversion is completed (step 140). If the stack is not empty, a list head, node, and stream size is popped from the stack (step 142) and the popped node's children pointer is set to the current list head (step 144). The stream size is set to the popped stream size minus the popped node's size (step 146) and the list head is set to the popped list head (step 148). The stream size is checked to determine if it is zero (step 136) and the process of steps 108–148 is repeated until the stack is empty.

Figure 3:
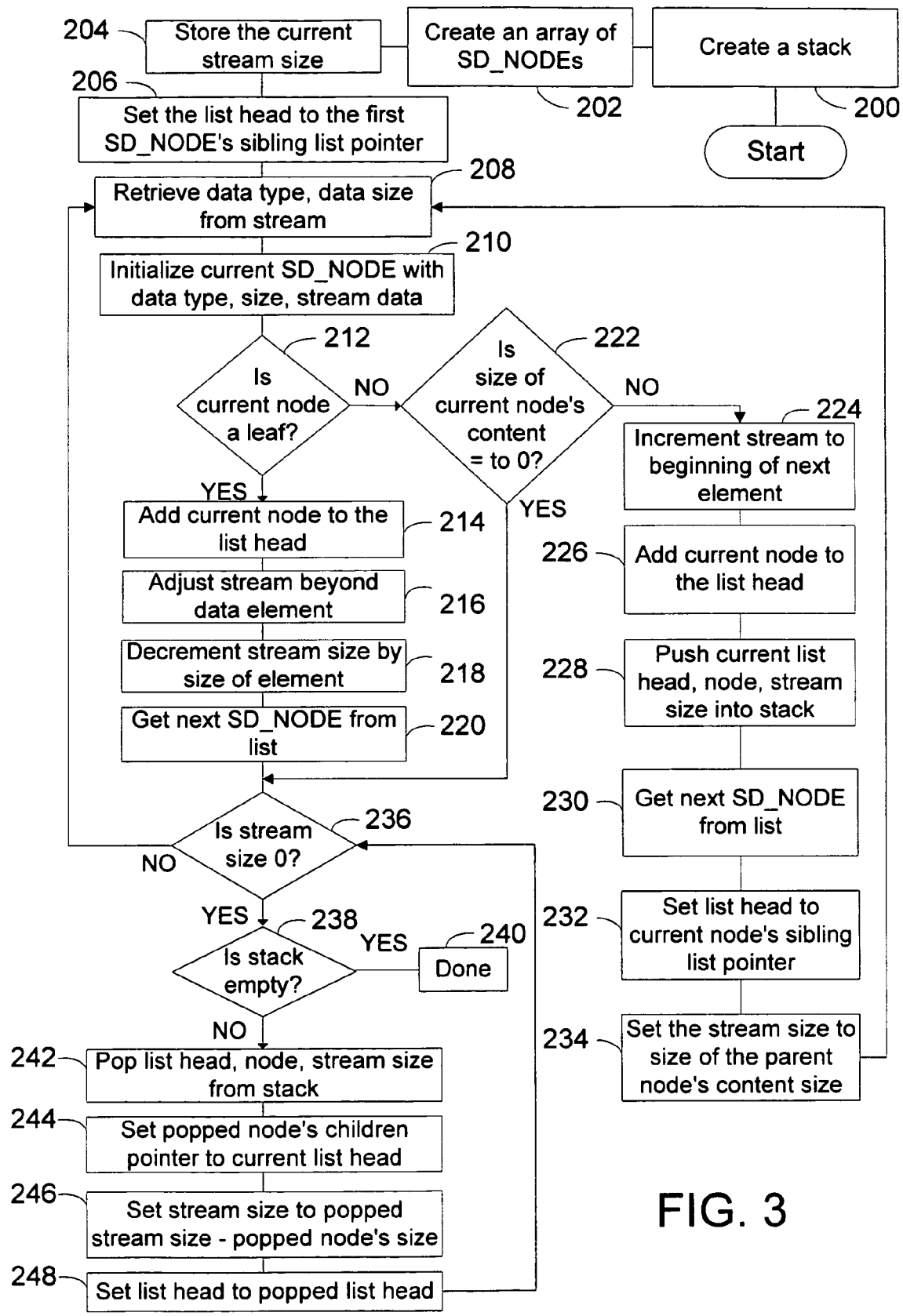
FIG. 3 is a flowchart illustrating how a service discovery stream is converted using a node.

Turning now to FIG. 3, the steps taken to convert a service discovery stream will be described when the service discovery does not have a sentinel node. Note that these steps can also be used if the service discovery stream has a sentinel node. A stack is created (step 200) and an array of SD_NODEs is created (step 202). The number of nodes is based upon the number of elements in the stream The node is defined as:

```
struct SD_NODE {
    UCHAR Type;          // contains the element type
    UCHAR SpecificType;  // contains specific element type (i.e, a 4
                         byte integer)
    ULONG DataSize;      // size of the element's data
    union {
        // all of the different data types defined
    } u;
    LIST_ENTRY Link;    // link to next and previous siblings
}
```

The current service discovery stream size is stored (step 204) and the list head is set to the service discovery stream's first SD_NODE's sibling list pointer (step 206). The data type and data size is retrieved from the service discovery stream (step 208) and the current node is initialized with the data type, the data size, and the service discovery stream data (step 210). The current node is checked to see if it is a leaf node or a parent node (step 212).

If the current node is a parent node, the size of the node's content is determined and checked to see if it is equal to zero (step 222). If the content is non-zero, the service discovery stream is incremented to the beginning of the next element of the service discovery stream (step 224). The current node is added to the list head (step 226), and the current list head, node, and stream size is pushed into the stack (step 228). The next node from the service discovery stream is obtained (step 230) and the list head is set to the next node's sibling list pointer (step 232). The stream size is set to the size of the parent node content size (step 234) and steps 208–212 are repeated for the next node. If the content is zero, the stream size is checked to determine if it is zero (step 236).

If the current node is a leaf node, the current node is added to the list head (step 214) and the service discovery stream is adjusted beyond the data element (step 216). The stream size is decremented by the size of the element (step 218) and the next node is obtained (step 220). The stream size is then checked to determine if it is zero (step 236).

If the stream size is not zero, the process for the next node is started by repeating steps 208 to 236. If the stream size is zero, the stack is checked to see if it is empty (step 238). If the stack is empty, the conversion is completed (step 240). If the stack is not empty, a list head, node, and stream size is popped from the stack (step 242) and the popped node's children pointer is set to the current list head (step 244). The stream size is set to the popped stream size minus the popped node's size (step 246) and the list head is set to the popped list head (step 248). The stream size is checked to determine if it is zero (step 236) and the process of steps 208–248 are repeated until the stack is empty.

Figure 4:
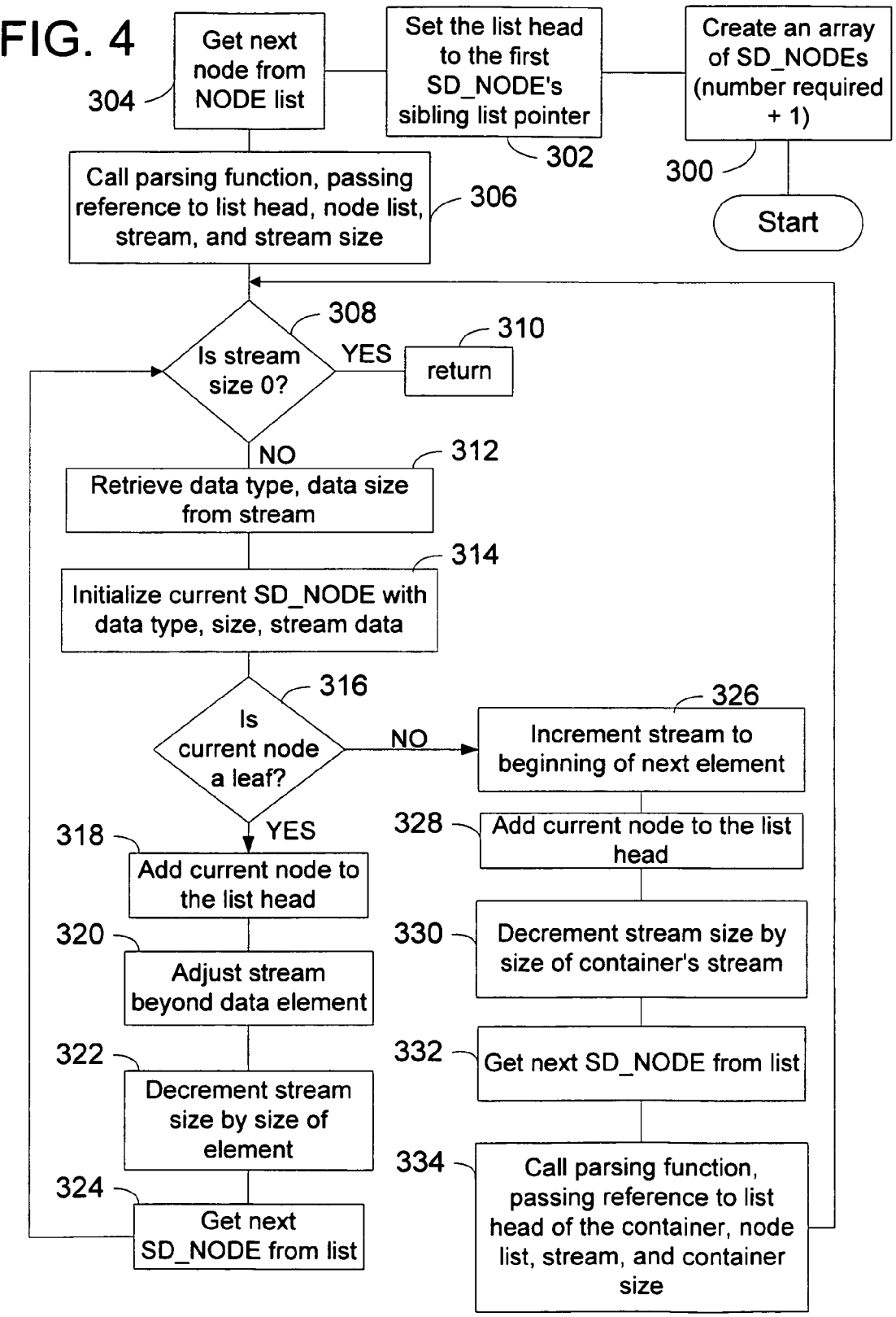
FIG. 4 is a flowchart illustrating how a service discovery stream is recursively converted into an N-ary tree.

Turning now to FIG. 4, the steps taken to convert a service discovery stream to an N-ary tree will be described using a recursive method. These steps can be used for any valid service discovery stream. An array of SD_NODEs is created (step 300). The number of nodes in the array is set to one more than the number of required nodes. The number of required nodes is based upon the number of elements in the stream. A node is defined as:

```
Struct SD_NODE_HEADER{
    UCHAR Type;         // contains the element type
    UCHAR SpecificType; // contains specific element type (i.e, a 4
                                                            byte integer)
    LIST_HEAD Link;
}
struct SD_NODE {
    SD_NODE_HEADER hdr;
    union {
        // all of the different data types defined
        // . . . etc . . .
        // sequence
        SD_NODE_HEADER sequenceHdr;
        // alternative
        SD_NODE_HEADER alternativeHdr;
    } u;
}
``` where sequenceHdr and alternativehdr are list heads. The list head is set to the first SD_NODE's sibling list pointer (step 302) and the next node is obtained (step 304). A parsing function is called passing a reference to the list head, the node list, the service discovery stream, and the stream size (step 306). The stream size is checked to determine if it is zero (step 308). If the stream size is zero, the process ends (step 310).

If the stream size is not zero, the data type and data size is retrieved from the service discovery stream (step 312) and the current SD_NODE is initialized with the data type, data size, and the stream data (step 314). The current node is checked to see if it is a leaf node or a parent node (step 316).

If the current node is a parent node, the service discovery stream is incremented to the beginning of the next element of the service discovery stream (step 326). The current node is added to the list head (step 328) and the stream size is set to the size of the container's stream size (step 330). The next node is obtained from the list (step 332) and steps 308–316 are repeated for the next node.

If the current node is a leaf node, the current node is added to the list head (step 318) and the service discovery stream is adjusted to beyond the element (step 320). The stream size is decremented by the size of the element (step 322) and the next node is obtained from the list (step 324). The process outlined in steps 308 to 334 is then repeated until a stream size of zero is detected, at which time the process ends.

Figure 5:
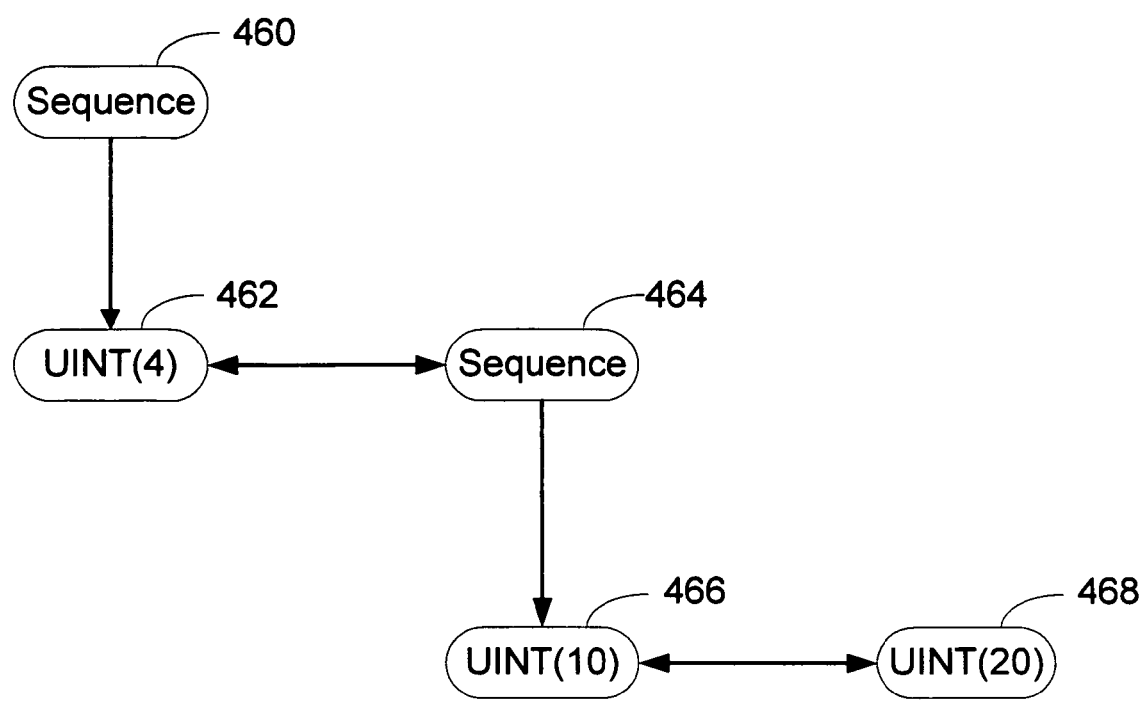
FIG. 5 shows an illustrative example of an N-ary tree.

FIG. 5 illustrates an exemplary N-ary tree for a service discovery stream obtained from following the steps outlined in any of the embodiments described above. For purposes of illustration, the service discovery stream contains a sequence which contains an 8 bit unsigned integer of 4 and another sequence which contains two 8 bit unsigned integers of 10 and 20. The service discovery stream would look like 0x350808043504080a0814 (hex). In FIG. 5, a line with a single arrow indicates a single link between elements and a line with two arrows indicates a double link between elements. The first sequence 460 of the N-ary tree is linked to the unsigned integer of 4 (UINT (4)) 462. The UINT 462 is doubly linked to sequence 464 which is linked to UINT(10) 466, the unsigned integer of 10 and UINT(20) 468, the unsigned integer of 20. It should be noted that the data size is not required for the N-ary tree.

An addition of a sequence to the N-ary tree or the addition of a data structure to a sequence of the N-ary tree would simply require the sequence or data structure to be added to be inserted into the tree at the appropriate location and linked to the adjacent data structure/sequence of the tree. Removing a data structure or sequence merely requires the data structure or sequence to be removed to be taken out of the tree and linking the data structures/sequences that were linked to the removed data structure or sequence to each other. Similarly, all that is needed to change a sequence or data structure is to combine the steps of adding and removing a sequence or data structure. Note that adding, removing, or changing a sequence or data structure only requires one modification to the tree. Conversely, modification of a service discovery stream may alter bytes before, after, and at the point of modification.

Constructing a service discovery stream from an N-ary tree is straightforward. The service discovery stream must be constructed from the bottom up. Beginning at the bottom of the N-ary tree, the sequences and their elements are converted one sequence at a time. The conversion requires that the data element size and the data element type be included with the element in a linear stream of data. After the first sequence and its elements have been converted, the next sequence is converted and placed in front of the linear stream of data representing the first sequence. The conversion is repeated until all sequences are converted, which results in the service discovery stream.

Representing a service discovery stream as an N-ary tree has been described. The ease of which the N-ary tree can be modified has been described. This likelihood of error is reduced since only one modification to the tree is required when a change, addition, or removal of a data structure or sequence is made. The data size of a data structure does not need to be known until the tree is converted into a service discovery stream.

All of the references cited herein, including patent applications are hereby incorporated in their entireties by reference. In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A computer-readable medium having computer-executable instructions for performing steps to convert a service discovery stream into an N-ary tree, the service discovery stream having a list of nodes, each node having a data element, a data type and a data size, the service discovery stream having a stream size, the steps comprising:
   a) determining the data type and the data size of one of the nodes from the service discovery stream, wherein determining the data type of the node comprises identifying the data type from a collection of data types comprising nil, unsigned integer, signed integer, universally unique identifier, text string, Boolean, uniform resource locator, data element sequence and data element alternative data types;
   b) adding the node to a list head;
   c) performing one of decrementing the stream size by the data size and incrementing the service discovery stream to the beginning of a next data element;
   d) obtaining a next node from the list of nodes; and
   e) repeating a), b) and c) until the N-ary tree is formed.

2. The computer-readable medium of claim 1 having further computer-executable instructions for performing the steps of:
   ensuring the service discovery stream is well-formed;
   determining the number of nodes in the list of nodes;
   creating a stack; and
   setting the list head to a sibling list pointer of the node.

3. The computer-readable medium of claim 1 having further computer-executable instructions for performing the step of repeating steps a), b) and c) for the next node.

4. The computer-readable medium of claim 3 having further computer-executable instructions for performing the step of repeating steps a), b), c) and d) for each node in the list of nodes.

5. The computer-readable medium of claim 1 having further computer-executable instructions for performing the step of determining if the node is a leaf node.

6. The computer-readable medium of claim 5 having further computer-executable instructions for performing the steps of:
   if the node is a leaf node:
      adjusting the service discovery stream beyond the data element;
      determining if the stream size of the next node is zero; and
      wherein the step of performing one of decrementing the stream size by the element size and incrementing the service discovery stream to the beginning of the next node comprises the step of decrementing the stream size by the data size.

7. The computer-readable medium of claim 5 having further computer-executable instructions for performing the steps of:
   if the node is not a leaf node:
   determining if the data size is zero;
   if the data size is not zero, the step of performing one of decrementing the stream size by the data size and incrementing the service discovery stream to the beginning of a next node comprises the step of incrementing the service discovery stream to the beginning of the next node; and
   repeating steps a), b), c), and d).

8. The computer-readable medium of claim 7 having further computer-executable instructions for performing the steps of:
   if the node is not a leaf node:
      pushing the list head, the node, and the stream size into a stack; and
      setting the list head to one of a sibling list pointer of the node and a container list head;
      setting the stream size to one of a size of a parent node content size and a container stream size.

9. The computer-readable medium of claim 1 having further computer-executable instructions for performing the steps of:
   if the stream size is zero;
   determining if the stack is empty;
   if the stack is not empty:
   obtaining a popped list head, the next node, and a popped stream size from the stack;
   setting a children pointer of the next node to the list head;
   setting the stream size to a revised stream size, the revised stream size formed by subtracting the data size of the next node from the popped stream size; and
   setting the list head to the popped list head.

10. A method to convert a service discovery stream to an N-ary tree, the service discovery stream having a first number of elements, each element having an element type and an element size, the service discovery stream having a stream size, the steps comprising:
    setting a list head to a sibling list pointer of a first node;
    determining the element type and the element size of a first element from the service discovery stream, wherein determining the element type of the first element comprises identifying the element type from a collection of element types comprising nil, unsigned integer, signed integer, universally unique identifier, text string, Boolean, uniform resource locator, data element sequence and data element alternative element types;
    initializing the first node with the first element and the element type and the element size of the first element;
    determining if the first node is a leaf node; and
    if the first node is a leaf node:
       adding the first node to a tail of a list;
       adjusting the service discovery stream beyond the first element; and
       decrementing the stream size by the element size of the first element; and
    obtaining a new node from a node listing.

11. The method of claim 10 further comprising the steps of
    creating an array of nodes having a number of nodes, the number of nodes equal to the first number of elements plus one; and
    creating a stack.

12. The method of claim 11 further comprising the steps of:
    if the first node is a not a leaf node:
    determining if the element size of the first node is equal to zero;
    if the element size of the first node is not equal to zero:
       incrementing the service discovery stream to the beginning of a next element;
       pushing the first node, the stream size, and the list head into a stack;
       adding the first node to the tail of the list;

setting the list head to a container list head of the first node; setting the stream size to a container stream size; and
obtaining the new node from the node listing.

13. The method of claim 12 further comprising the steps of:
determining if the stream size equals zero; and
if the stream size equals zero:
   determining if the stack is empty;
   if the stack is not empty:
      popping a new list head, the new node, and a new stream size from the stack;
      setting a children pointer of the new node to the list head;
      setting the stream size to the new stream size minus a size of the new node; and
      setting the list head to the new list head.

14. The method of claim 13 further comprising the steps of: for each node:
a) retrieving a new element type and a new element size of a new element from the service discovery stream;
b) initializing the node with the new element and the new element type and the new element size of the new element;
c) determining if the node is a leaf node; and
d) if the node is a leaf node:
   adding the node to a tail of the list head;
   adjusting the service discovery stream beyond the new element;
   decrementing the stream size by the new element size of the new element;
   obtaining the new node from the node listing;
e) if the node is a not a leaf node:
   determining if the new element size of the node is equal to zero;
   if the new element size of the node is not equal to zero:
      incrementing the service discovery stream to the beginning of the next element;
      pushing the node, the stream size, and the list head into the stack; adding the node to the tail of the list;
      setting the list head to the container list head of the node; setting the stream size to the container stream size;
      obtaining the new node from the list;
f) determining if the stream size equals zero; and
g) if the stream size equals zero:
   determining if the stack is empty;
   if the stack is not empty:
      popping the new list head, the new node, and the new stream size from the stack;
      setting a children pointer of the new node to the list head;
      setting the stream size to the new stream size minus a size of the new node;
      setting the list head to the new list head; and
   if the stream size does not equal zero, repeating steps a) to g) for the new node.

15. A method to convert a service discovery stream to an N-ary tree, the service discovery stream having a first number of elements, each element having an element type and an element size, the service discovery stream having a stream size, the steps comprising:
setting a list head to a sibling list pointer of a first node of the N-ary tree;
determining the element type and the element size of a first element from the service discovery stream, wherein determining the element type of the first element comprises identifying the element type from a collection of element types comprising nil, unsigned integer, signed integer, universally unique identifier, text string, Boolean, uniform resource locator, data element sequence and data element alternative element types;
initializing the first node of the N-ary tree with the first element and the element type and the element size of the first element;
determining if the first node is a leaf node; and
if the first node is a leaf node:
   adding the first node to the list head;
   adjusting the service discovery stream beyond the first element;
   decrementing the stream size by the element size of the first element;
   obtaining a new node from a node listing; and
   repeating the acts of setting, retrieving, initializing, and determining until the N-ary tree is formed.

16. The method of claim 15 further comprising the steps of:
creating an array of nodes having a number of nodes, the number of nodes equal to the first number of elements plus one; and
creating a stack.

17. The method of claim 16 further comprising the steps of:
if the first node is a not a leaf node:
determining if the element size of the first node is equal to zero; if the
element size of the first node is not equal to zero:
   incrementing the service discovery stream to the beginning of a next element;
   pushing the first node, the stream size, and the list head into the stack;
   adding the first node to the list head;
   setting the stream size to a content size of a parent node;
   obtaining the new node from the node listing; and
   setting the list head to a sibling list pointer of the new node.

18. The method of claim 17 further comprising the steps of:
determining if the stream size equals zero; and
if the stream size equals zero:
   determining if the stack is empty;
   if the stack is not empty:
      popping a new list head, the new node, and a new stream size from the stack;
      setting a children pointer of the new node to the list head;
      setting the stream size to the new stream size minus a size of the new node; and
      setting the list head to the new list head.

19. The method of claim 18 further comprising the steps of:
for each node:
a) retrieving a new element type and a new element size of a new element from the service discovery stream;
b) initializing the node with the new element and the new element type and the new element size of the new element;
c) determining if the node is a leaf node; and
d) if the node is a leaf node:
   adding the node to the list head;
   adjusting the service discovery stream beyond the new element; decrementing the stream size by the new element size of the new element; obtaining the new node from the node listing;
e) if the node is a not a leaf node:
  determining if the new element size of the node is equal to zero;
  if the new element size of the node is not equal to zero:
  incrementing the service discovery stream to the beginning of the next element;
  pushing the node, the stream size, and the list head into the stack; adding the node to the list head;
  obtaining the new node from the node listing;
  setting the list head to the sibling list pointer of the new node;
  setting the stream size to the container stream size;
  determining if the stream size equals zero; and
  if the stream size equals zero:
f) determining if the stack is empty;
  if the stack is not empty:
    popping the new list head, the new node, and the new stream size from the stack;
    setting a children pointer of the new node to the list head;
    setting the stream size to the new stream size minus a size of the new node;
    setting the list head to the new list head; and
    if the stream size does not equal zero, repeating steps a) to g) for the new node.

20. A method to convert a service discovery stream to an N-ary tree comprising:
a) receiving a reference to a list head, a node list, a stream, and a stream size;
b) determining if the stream size is equal to zero;
c) if the stream size is not equal to zero:
  determining a data type and a data size of a data element from the stream, wherein determining the data type of the data element comprises identifying the data type from a collection of data types comprising nil, unsigned integer, signed integer, universally unique identifier, text string, Boolean, uniform resource locator, data element sequence and data element alternative element types;
  initializing a node with the data type, the data size, and the data element;
  adding the node to the list head;
  performing one of adjusting the stream beyond the data element and incrementing the stream to the beginning of a next data element;
  performing one of decrementing the stream size by the data size and decrementing the stream size by a container size of a stream of a container;
d) obtaining a next node from the node list; and
e) repeating a), b) and c) until the N-ary tree is formed.

21. The method of claim 20 further comprising the steps of:
determining if the node is a leaf node;
if the node is a leaf node, repeating steps a) to c) for the next node; and
wherein the step of performing one of adjusting the stream beyond the data element and incrementing the stream to the beginning of the next data element comprises the step of adjusting the stream beyond the data element and the step of performing one of decrementing the stream size by the data size and decrementing the stream size by the container size of the stream of the container comprises the step of decrementing the stream size by the data size.

22. The method of claim 20 further comprising the steps of
determining if the node is a leaf node;
if the node is not a leaf node:
  calling a parsing function to receive a reference to the list head of the container, the node list, the stream, and the container size;
  repeating steps a) to c) for the next node; and
  wherein the step of performing one of adjusting the stream beyond the data element and incrementing the stream to the beginning of the next data element comprises the step of incrementing the stream to the beginning of the next data element and the step of performing one of decrementing the stream size by the data size and decrementing the stream size by the container size of the stream of the container comprises the step of decrementing the stream size by the container size of the stream of the container.

23. The method of claim 20 further comprising the steps of:
creating an array of nodes having a number of nodes, the number of nodes equal to a number of data elements in the stream;
setting the list head to a sibling list pointer of a first node;
obtaining the next node; and
calling a parsing function to receive a reference to the list head of the container, the node list, the stream, and the container size.

* * * * *